(12) United States Patent
Otani (10) Patent No.: US 12,007,407 B2
(45) Date of Patent: Jun. 11, 2024

(54) SENSOR MODULE AND MEASUREMENT SYSTEM

(71) Applicant: SEIKO EPSON CORPORATION, Tokyo (JP)

(72) Inventor: Fumikazu Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/703,216

(22) Filed: Mar. 24, 2022

(65) Prior Publication Data
US 2022/0308083 A1 Sep. 29, 2022

(30) Foreign Application Priority Data
Mar. 29, 2021 (JP) ................. 2021-054956

(51) Int. Cl.
*G01P 15/08* (2006.01)
*G01P 3/00* (2006.01)
*G01P 15/18* (2013.01)

(52) U.S. Cl.
CPC ............ *G01P 15/08* (2013.01); *G01P 3/00* (2013.01); *G01P 15/18* (2013.01)

(58) Field of Classification Search
CPC ............ G01P 15/08; G01P 15/18; G01P 3/00
See application file for complete search history.

(56) References Cited

U.S. PATENT DOCUMENTS

| | | | | |
|---|---|---|---|---|
| 6,023,664 A * | 2/2000 | Bennet | ............... | G01P 15/18 73/488 |
| 6,389,078 B1 * | 5/2002 | Hessel | ............... | H04L 1/0054 375/259 |
| 2001/0045883 A1 * | 11/2001 | Holdaway | ............... | H04B 1/04 102/275.9 |
| 2008/0079594 A1 * | 4/2008 | Tronconi | ............... | G01P 15/0891 340/669 |
| 2009/0271142 A1 * | 10/2009 | Yamashita | ............... | G01D 3/036 702/141 |
| 2012/0023354 A1 * | 1/2012 | Chino | ............... | G01P 15/00 713/323 |
| 2012/0030419 A1 * | 2/2012 | Chino | ............... | G01D 3/022 711/E12.001 |
| 2015/0238813 A1 * | 8/2015 | Saiki | ............... | A63B 24/0003 702/141 |
| 2015/0285834 A1 * | 10/2015 | Shibuya | ............... | A63B 69/36 702/150 |
| 2015/0332785 A1 * | 11/2015 | Steensgaard-Madsen | ............... | G06F 30/3312 341/122 |
| 2016/0269011 A1 * | 9/2016 | Uehara | ............... | G01P 15/09 |
| 2019/0134461 A1 * | 5/2019 | Segami | ............... | G01P 15/18 |
| 2019/0265269 A1 * | 8/2019 | Yamashita | ............... | G01P 15/18 |
| 2019/0285663 A1 | 9/2019 | Chino et al. | | |

(Continued)

FOREIGN PATENT DOCUMENTS

JP 2019-163955 9/2019

*Primary Examiner* — Helen C Kwok
(74) *Attorney, Agent, or Firm* — Rankin, Hill & Clark LLP (57) ABSTRACT

A sensor module includes: an inertial sensor; and a processing circuit processing an output signal from the inertial sensor. The processing circuit varies processing of the output signal according to a sampling period for acquiring the output signal. The processing circuit may change the sampling period for acquiring the output signal according to a content of processing of the output signal.

5 Claims, 6 Drawing Sheets

(56) References Cited

U.S. PATENT DOCUMENTS

| | | | |
|---|---|---|---|
| 2019/0308481 A1* | 10/2019 | Kabasawa | G01P 15/125 |
| 2020/0283108 A1* | 9/2020 | Zagyva | G01P 15/105 |
| 2021/0123946 A1* | 4/2021 | McNeil | B81B 3/0027 |
| 2021/0231703 A1* | 7/2021 | Nakajima | G01C 19/5776 |

* cited by examiner

SENSOR MODULE AND MEASUREMENT SYSTEM

The present application is based on, and claims priority from JP Application Serial Number 2021-054956, filed Mar. 29, 2021, the disclosure of which is hereby incorporated by reference herein in its entirety.

BACKGROUND

1. Technical Field

The present disclosure relates to a sensor module and a measurement system.

2. Related Art

For example, JP-A-2019-163955 describes an inertial sensor unit having an angular velocity sensor device, an acceleration sensor device, and a microcontroller that processes an output signal from the angular velocity sensor device and the acceleration sensor device and outputs the processed output signal to a host device. The inertial sensor unit is also referred to as IMU (inertial measurement unit).

However, JP-A-2019-163955 does not disclose or suggest a sampling period of the output signal. As the sampling period becomes shorter, a quantization error in converting the output signal (analog signal) to a digital signal becomes smaller but signal processing that can be executed during the sampling may be limited. On the other hand, as the sampling period becomes longer, the quantization error in converting the output signal (analog signal) to a digital signal becomes greater but the signal processing that can be executed during the sampling is less likely to be limited. In this way, the quantization error and the limitation to the signal processing are in a tradeoff relationship. Therefore, how the sampling period is decided is important.

SUMMARY

A sensor module according to an aspect of the present disclosure includes: an inertial sensor; and a processing circuit processing an output signal from the inertial sensor. The processing circuit varies processing of the output signal according to a sampling period for acquiring the output signal.

A sensor module according to another aspect of the present disclosure includes: an inertial sensor; and a processing circuit processing an output signal from the inertial sensor. The processing circuit changes a sampling period for acquiring the output signal according to a content of processing of the output signal.

A sensor module according to still another aspect of the present disclosure includes: an inertial sensor; and a processing circuit processing an output signal from the inertial sensor. The processing circuit sets a content of processing to be performed on the output signal from the inertial sensor and a sampling period for acquiring the output signal from the inertial sensor, according to data requested by a host device.

A measurement system according to still another aspect of the present disclosure includes: the foregoing sensor module; and a host device electrically coupled to the sensor module.

DESCRIPTION OF EXEMPLARY EMBODIMENTS

The sensor module and the measurement system according to the present disclosure will now be described in detail, based on embodiments illustrated in the accompanying drawings.

First Embodiment

Figure 1:
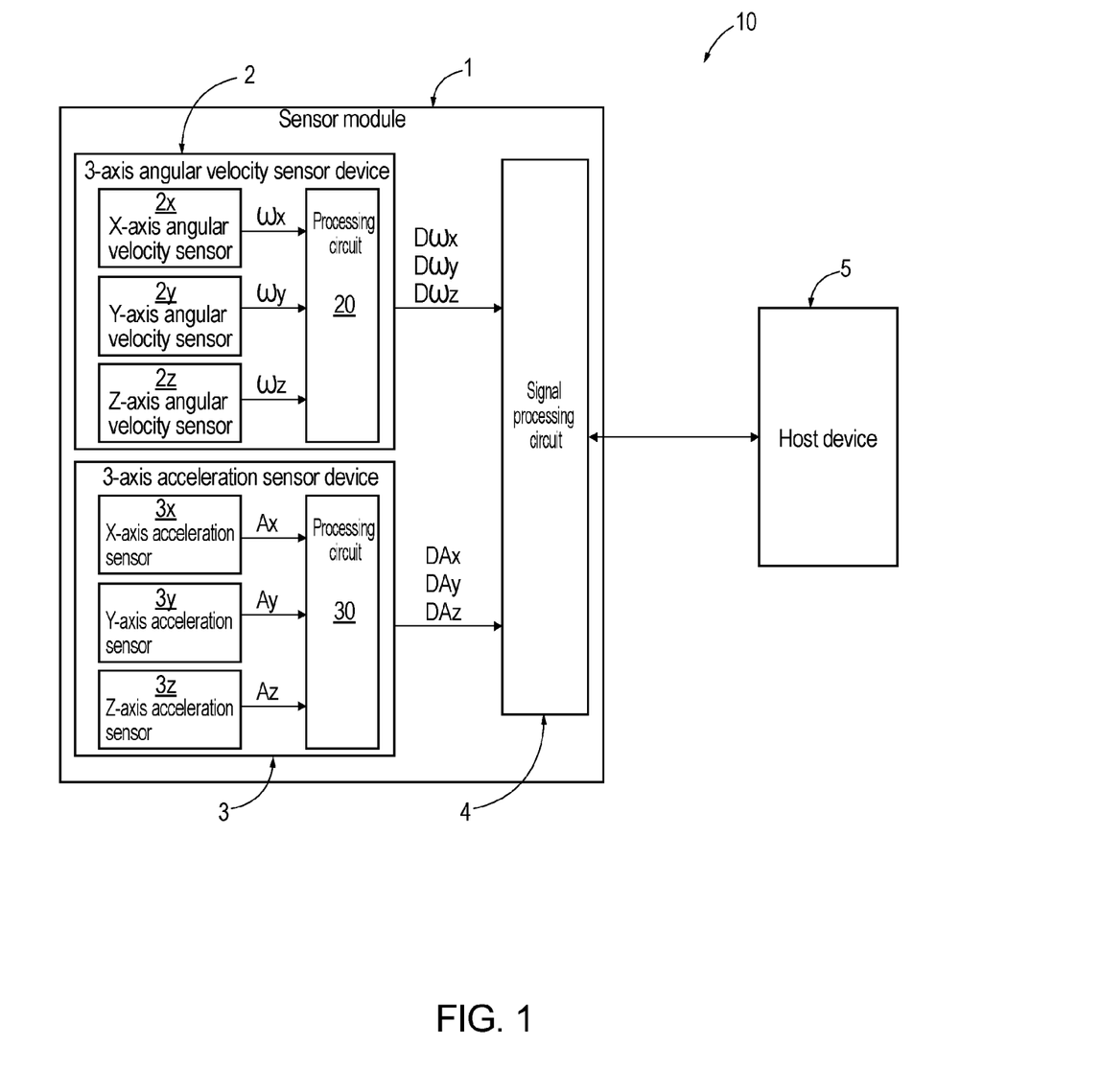
FIG. 1 is a block diagram showing an overall configuration of a measurement system according to a first embodiment of the present disclosure.
Figure 2:
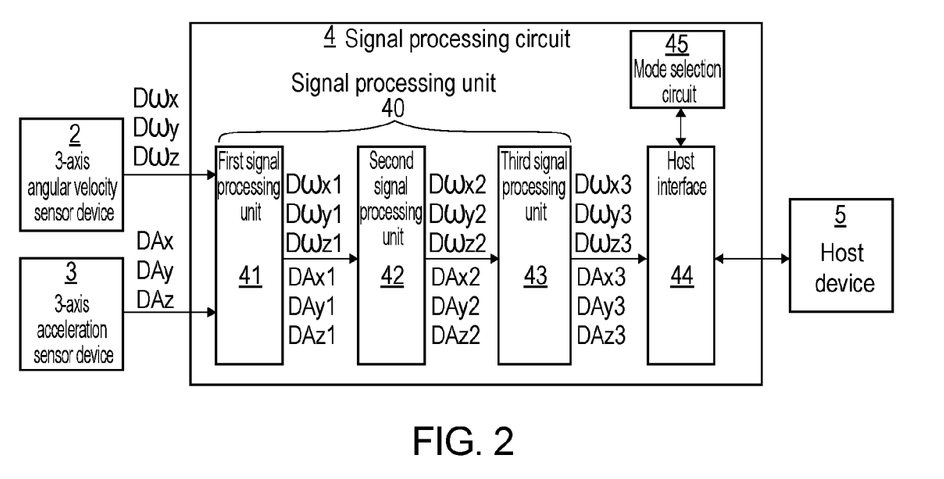
FIG. 2 is a block diagram showing a circuit configuration of a signal processing circuit.
Figure 3:
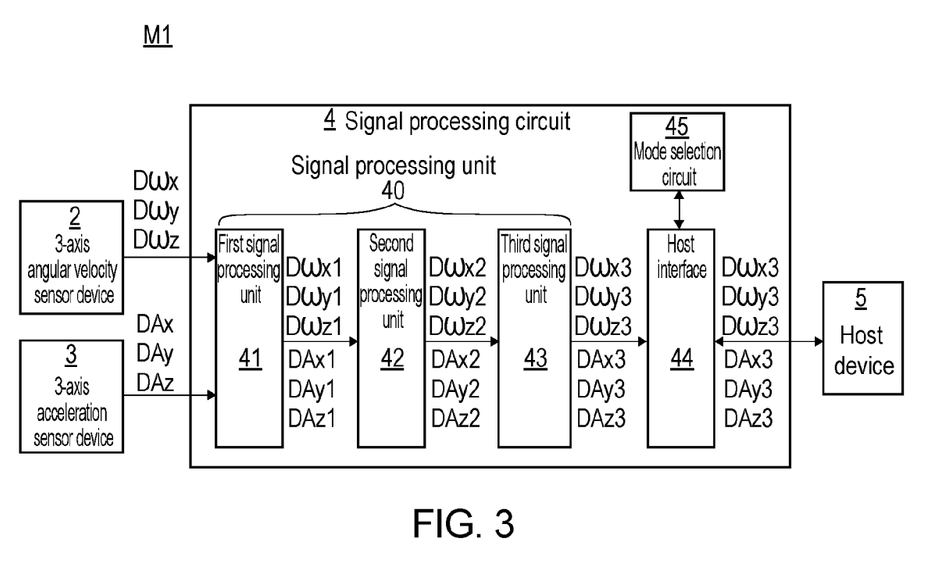
FIG. 3 is a block diagram showing signal processing in a first signal processing mode.
Figure 4:
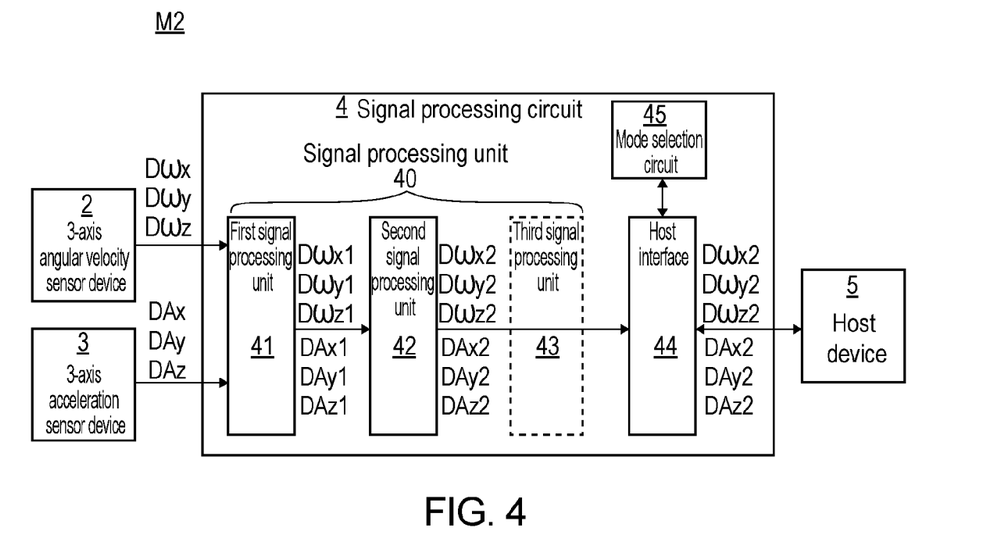
FIG. 4 is a block diagram showing signal processing in a second signal processing mode.
Figure 5:
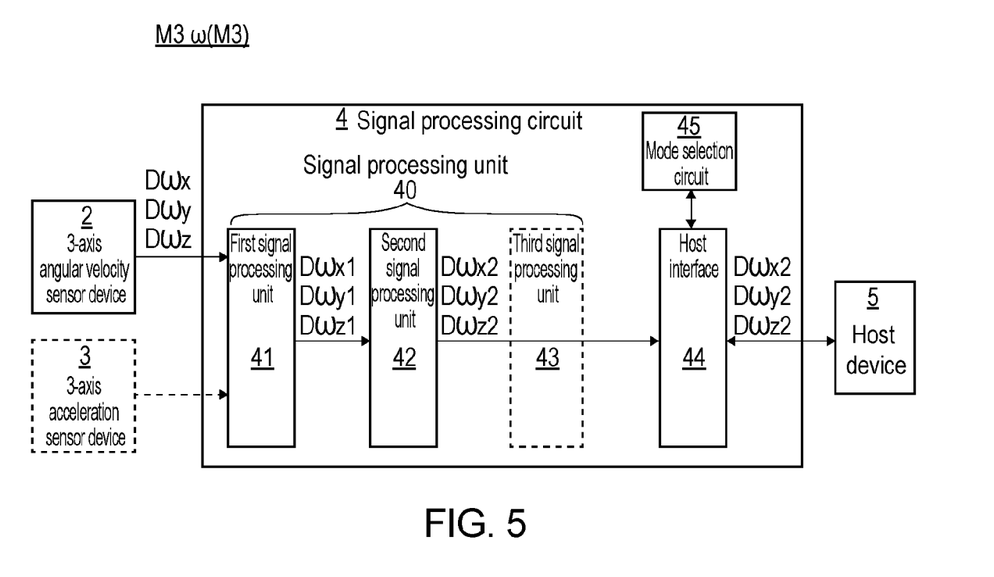
FIG. 5 is a block diagram showing signal processing in an angular velocity mode.
Figure 6:
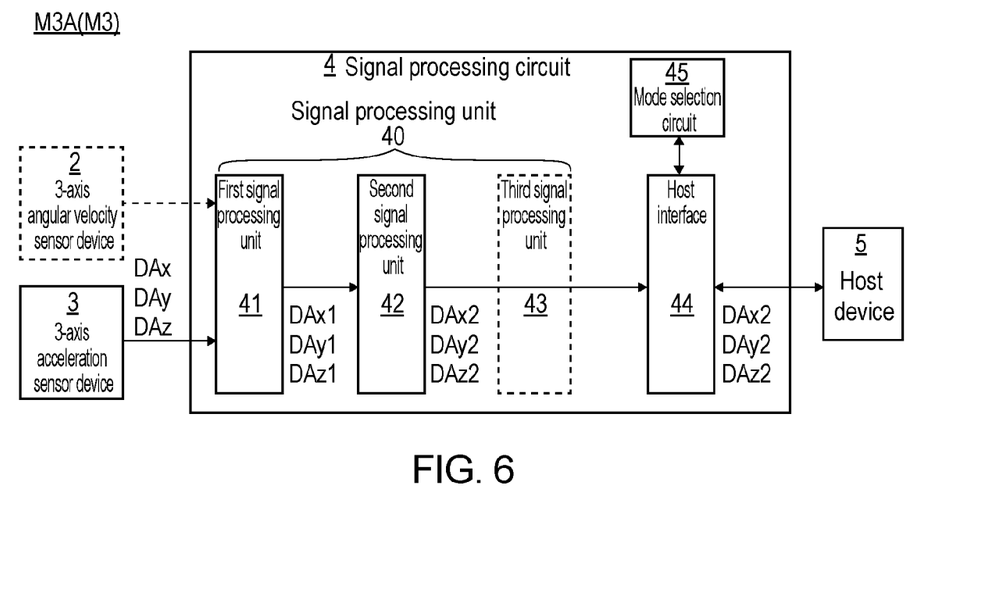
FIG. 6 is a block diagram showing signal processing in an acceleration mode.

FIG. 1 is a block diagram showing an overall configuration of a measurement system according to a first embodiment of the present disclosure. FIG. 2 is a block diagram showing a circuit configuration of a signal processing circuit. FIG. 3 is a block diagram showing signal processing in a first signal processing mode. FIG. 4 is a block diagram showing signal processing in a second signal processing mode. FIG. 5 is a block diagram showing signal processing in an angular velocity mode. FIG. 6 is a block diagram showing signal processing in an acceleration mode.

As shown in FIG. 1, a measurement system 10 has a sensor module 1 and a host device 5 electrically coupled to the sensor module 1. The sensor module 1 is an IMU (inertial measurement unit) and has a 3-axis angular velocity sensor device 2 and a 3-axis acceleration sensor device 3, which are inertial sensors, and a signal processing circuit 4 processing a signal outputted from each of these devices 2, 3. These devices 2, 3 and the signal processing circuit 4 are coupled together via an SPI (serial peripheral interface), for example. However, the method for coupling these devices is not particularly limited.

3-Axis Angular Velocity Sensor Device 2

As shown in FIG. 1, the 3-axis angular velocity sensor device 2 separately detects an angular velocity $\omega x$ about an X-axis, an angular velocity $\omega y$ about a Y-axis, and an angular velocity $\omega z$ about a Z-axis, and outputs data $D\omega x$ of the X-axis angular velocity, data $D\omega y$ of the Y-axis angular velocity, and data $D\omega z$ of the Z-axis angular velocity, which are digital data.

The 3-axis angular velocity sensor device 2 has an X-axis angular velocity sensor $2x$ detecting the angular velocity $\omega x$ about the X-axis, a Y-axis angular velocity sensor $2y$ detecting the angular velocity $\omega y$ about the Y-axis, a Z-axis angular velocity sensor $2z$ detecting the angular velocity $\omega z$ about the Z-axis, and a processing circuit 20 processing detection signals from these sensors $2x$, $2y$, $2z$ and outputting the data $D\omega x$, $D\omega y$, $D\omega z$.

The processing circuit 20 includes, for example, an analog circuit including an amplification circuit amplifying the detection signals from the sensors $2x$, $2y$, $2z$ and a synchronous detection circuit performing synchronous detection with respect to the detection signals, or the like, and an A/D conversion circuit converting an analog signal from the analog circuit to a digital signal, or the like. The A/D conversion circuit performs A/D conversion of, for example, an analog signal of the X-axis angular velocity, an analog signal of the Y-axis angular velocity, and an analog signal of the Z-axis angular velocity to digital data in time division.

However, the configuration of the 3-axis angular velocity sensor device 2 is not particularly limited. For example, an X-axis angular velocity sensor device detecting the angular velocity cox about the X-axis and outputting the data Dωx of the X-axis angular velocity, a Y-axis angular velocity sensor device detecting the angular velocity coy about the Y-axis and outputting the data Dωy of the Y-axis angular velocity, and a Z-axis angular velocity sensor device detecting the angular velocity ωz about the Z-axis and outputting the data Dωz of the Z-axis angular velocity, may be integrated together. Also, one or two detection axes of the X-axis, the Y-axis, and the Z-axis may be omitted.

3-Axis Acceleration Sensor Device 3

As shown in FIG. 1, the 3-axis acceleration sensor device 3 separately detects an acceleration Ax in an X-axis direction, an acceleration Ay in a Y-axis direction, and an acceleration Az in a Z-axis direction, and outputs data DAx of the X-axis acceleration, data DAy of the Y-axis acceleration, and data DAz of the Z-axis acceleration, which are digital data.

The 3-axis acceleration sensor device 3 has an X-axis acceleration sensor 3x detecting the acceleration Ax in the X-axis direction, a Y-axis acceleration sensor 3y detecting the acceleration Ay in the Y-axis direction, a Z-axis acceleration sensor 3z detecting the acceleration Az in the Z-axis direction, and a processing circuit 30 processing detection signals from these sensors 3x, 3y, 3z and outputting the data DAx, DAy, DAz.

The processing circuit 30 includes, for example, an analog circuit including an amplification circuit amplifying the detection signals from the sensors 3x, 3y, 3z and a synchronous detection circuit performing synchronous detection with respect to the detection signals, or the like, and an A/D conversion circuit converting an analog signal from the analog circuit to a digital signal, or the like. The A/D conversion circuit performs A/D conversion of, for example, an analog signal of the X-axis acceleration, an analog signal of the Y-axis acceleration, and an analog signal of the Z-axis acceleration to digital data in time division.

However, the configuration of the 3-axis acceleration sensor device 3 is not particularly limited. For example, an X-axis acceleration sensor device detecting the acceleration Ax in the X-axis direction and outputting the data DAx of the X-axis acceleration, a Y-axis acceleration sensor device detecting the acceleration Ay in the Y-axis direction and outputting the data DAy of the Y-axis acceleration, and a Z-axis acceleration sensor device detecting the acceleration Az in the Z-axis direction and outputting the data DAz of the Z-axis acceleration, may be integrated together. Also, one or two detection axes of the X-axis, the Y-axis, and the Z-axis may be omitted.

Signal Processing Circuit 4

The signal processing circuit 4 has, for example, a processor (CPU) formed by a computer and processing information, a memory communicatively coupled to the processor, and an external interface. A program executable by the processor is saved in the memory. The processor reads and executes the program stored in the memory.

As shown in FIG. 2, the signal processing circuit 4 has a signal processing unit 40 processing the data Dωx, Dωy, Dωz, DAx, DAy, DAz outputted from the 3-axis angular velocity sensor device 2 and the 3-axis acceleration sensor device 3, a host interface 44 transmitting the data processed by the signal processing unit 40 to the external host device 5, and a mode selection circuit 45 changing the content of processing by the signal processing unit 40. The signal processing unit 40 has a first signal processing unit processing the data Dωx, Dωy, Dωz, DAx, DAy, DAz, a second signal processing unit 42 further processing each data processed by the first signal processing unit 41, and a third signal processing unit 43 further processing each data processed by the second signal processing unit 42.

The contents of the processing executed by the first signal processing unit 41, the second signal processing unit 42, and the third signal processing unit 43 are not particularly limited. In this embodiment, the first signal processing unit 41 is a filtering circuit eliminating a noise from the data Dωx, Dωy, Dωz, DAx, DAy, DAz and outputting data Dωx1, Dωy1, Dωz1, DAx1, DAy1, DAz1. The second signal processing unit 42 is a temperature compensation circuit performing temperature compensation of the data Dωx1, Dωy1, Dωz1, DAx1, DAy1, DAz1 and outputting data Dωx2, Dωy2, Dωz2, DAx2, DAy2, DAz2. The third signal processing unit 43 is a matrix calculation circuit performing matrix calculation for coordinate transformation of the data Dωx2, Dωy2, Dωz2, DAx2, DAy2, DAz2 and outputting data Dωx3, Dωy3, Dωz3, DAx3, DAy3, DAz3.

The data Dωx, Dωy, Dωz, DAx, DAy, DAz may correspond respectively to the sensors of the 3-axis angular velocity sensor device 2 and the 3-axis acceleration sensor device 3. The data Dωx1, Dωy1, Dωz1, DAx1, DAy1, DAz1 may correspond respectively to the sensors of the 3-axis angular velocity sensor device 2 and the 3-axis acceleration sensor device 3. The data Dωx2, Dωy2, Dωz2, DAx2, DAy2, DAz2 may correspond respectively to the sensors of the 3-axis angular velocity sensor device 2 and the 3-axis acceleration sensor device 3. The data Dωx3, Dωy3, Dωz3, DAx3, DAy3, DAz3 may correspond respectively to the sensors of the 3-axis angular velocity sensor device 2 and the 3-axis acceleration sensor device 3 or may be attitude data, position data or the like acquired by computing, for example. That is, the data Dωx3, Dωy3, Dωz3, DAx3, DAy3, DAz3 may or may not correspond respectively to the data Dωx, Dωy, Dωz, DAx, DAy, DAz.

The host interface 44 transmits the data Dωx3, Dωy3, Dωz3, DAx3, DAy3, DAz3 outputted from the signal processing unit 40, to the host device 5. The host interface 44 and the host device 5 are coupled together via an SPI (serial peripheral interface), for example. However, the method for coupling these components is not particularly limited.

The signal processing circuit 4 has a first signal processing mode M1, a second signal processing mode M2, and a third signal processing mode M3 differing from each other in the content of processing of the data Dωx, Dωy, Dωz, DAx, DAy, DAz. The mode selection circuit 45 is a circuit selecting one mode from among the first signal processing mode M1, the second signal processing mode M2, and the third signal processing mode M3 differing from each other in the content of signal processing, according to a sampling period T or a content of processing requested by the host device 5.

As the sampling period T becomes longer, a longer processing time can be taken to output data to the host device 5 after acquiring the data Dωx, Dωy, Dωz, DAx, DAy, DAz. Therefore, a greater amount of signal processing or relatively time-consuming signal processing can be performed and the reliability of the data Dωx, Dωy, Dωz, DAx, DAy, DAz is thus improved. However, the quantization error in A/D conversion increases. Meanwhile, as the sampling period T becomes shorter, the quantization error decreases but the processing time to output data to the host device 5 after acquiring the data Dωx, Dωy, Dωz, DAx, DAy, DAz becomes shorter and therefore a large amount of signal processing or relatively time-consuming signal processing cannot be performed. In this way, the quantization error and the limitation to the signal processing are in a tradeoff relationship.

Therefore, the signal processing circuit 4 selects an optimum mode from among the first signal processing mode M1, the second signal processing mode M2, and the third signal processing mode M3 according to the sampling period T or the content of processing requested by the host device 5 and thus takes balance between the quantization error and the limitation to the signal processing. Each of the first signal processing mode M1, the second signal processing mode M2, and the third signal processing mode M3 will now be described.

First Signal Processing Mode M1

As shown in FIG. 3, in the first signal processing mode M1, the data Dωx, Dωy, Dωz, DAx, DAy, DAz outputted from the 3-axis angular velocity sensor device 2 and the 3-axis acceleration sensor device 3 are processed by the first signal processing unit 41, the second signal processing unit 42, and the third signal processing unit 43, and the data Dωx3, Dωy3, Dωz3, DAx3, DAy3, DAz3 are outputted from the host interface 44 to the host device 5. That is, in the first signal processing mode M1, all the processing that can be performed by the signal processing circuit 4 is performed on the data Dωx, Dωy, Dωz, DAx, DAy, DAz. Thus, more accurate data can be outputted to the host device 5. Hereinafter, the processing time that is necessary to output the data Dωx3, Dωy3, Dωz3, DAx3, DAy3, DAz3 to the host device 5 after acquiring the data Dωx, Dωy, Dωz, DAx, DAy, DAz is referred to as Tm1.

Second Signal Processing Mode M2

As shown in FIG. 4, in the second signal processing mode M2, the data Dωx, Dωy, Dωz, DAx, DAy, DAz outputted from the 3-axis angular velocity sensor device 2 and the 3-axis acceleration sensor device 3 are processed by the first signal processing unit 41 and the second signal processing unit 42, and the data Dωx2, Dωy2, Dωz2, DAx2, DAy2, DAz2 are outputted from the host interface 44 to the host device 5. That is, the second signal processing mode M2 is a mode configured by omitting the processing by the third signal processing unit 43 from the first signal processing mode M1. As the processing by the third signal processing unit 43 is thus omitted, the processing time that is necessary to output the data Dωx2, Dωy2, Dωz2, DAx2, DAy2, DAz2 to the host device 5 after acquiring the data Dωx, Dωy, Dωz, DAx, DAy, DAz can be made shorter than the processing time Tm1 in the first signal processing mode M1. Therefore, in the second signal processing mode M2, the sampling period T can be set to be shorter than in the first signal processing mode M1. Hereinafter, the processing time that is necessary to output the data Dωx2, Dωy2, Dωz2, DAx2, DAy2, DAz2 to the host device 5 after acquiring the data Dωx, Dωy, Dωz, DAx, DAy, DAz is referred to as Tm2 (<Tm1).

The data Dωx3, Dωy3, Dωz3, DAx3, DAy3, DAz3 outputted to the host device 5 in the first signal processing mode M1 are, for example, attitude data or position data acquired by computing and may not correspond to the data Dωx, Dωy, Dωz, DAx, DAy, DAz outputted from the 3-axis angular velocity sensor device 2 and the 3-axis acceleration sensor device 3. Meanwhile, the data Dωx2, Dωy2, Dωz2, DAx2, DAy2, DAz2 outputted to the host device 5 in the second signal processing mode M2 may correspond to the data Dωx, Dωy, Dωz, DAx, DAy, DAz outputted from the 3-axis angular velocity sensor device 2 and the 3-axis acceleration sensor device 3. In this way, the signal processing circuit 4 may output data having different correspondence relationships with the individual sensors according to the mode. In the second signal processing mode M2, the host device 5 may compute attitude data or position data. The case where "the processing performed by the signal processing circuit 4 differs" includes the case where the content of the processing performed by the signal processing unit 40 differs as shown in FIGS. 3 and 4 and also includes the case where the data transmitted to outside from the host interface 44 differs.

Third Signal Processing Mode M3

The third signal processing mode M3 further includes an angular velocity mode M3ω where the data Dωx, Dωy, Dωz from the 3-axis angular velocity sensor device 2 are processed, and an acceleration mode M3A where the data DAx, DAy, DAz from the 3-axis acceleration sensor device 3 are processed.

As shown in FIG. 5, in the angular velocity mode M3ω, the data Dωx, Dωy, Dωz outputted from the 3-axis angular velocity sensor device 2 are processed by the first signal processing unit 41 and the second signal processing unit 42, and the data Dωx2, Dωy2, Dωz2 are outputted from the host interface 44 to the host device 5. That is, the angular velocity mode M3ω is a mode configured by omitting the processing of the data DAx, DAy, DAz from the second signal processing mode. As the processing of the data DAx, DAy, DAz is thus omitted, the processing time that is necessary to output the data Dωx2, Dωy2, Dωz2 to the host device 5 after acquiring the data Dωx, Dωy, Dωz can be made shorter than the processing time Tm2 in the second signal processing mode M2. Therefore, in the angular velocity mode M3ω, the sampling period T can be set to be shorter than in the second signal processing mode M2. Hereinafter, the processing time that is necessary to output the data Dωx2, Dωy2, Dωz2 to the host device 5 after acquiring the data Dωx, Dωy, Dωz is referred to as Tm3 (<Tm2).

As shown in FIG. 6, in the acceleration mode M3A, the data DAx, DAy, DAz outputted from the 3-axis acceleration sensor device 3 are processed by the first signal processing unit 41 and the second signal processing unit 42, and the data DAx2, DAy2, DAz2 are outputted from the host interface 44 to the host device 5. That is, the acceleration mode M3A is a mode configured by omitting the processing of the data Dωx, Dωy, Dωz from the second signal processing mode. As the processing of the data Dωx, Dωy, Dωz is thus omitted, the processing time that is necessary to output the data DAx2, DAy2, DAz2 to the host device 5 after acquiring the data DAx, DAy, DAz can be made shorter than the processing time Tm2 in the second signal processing mode M2. Therefore, in the acceleration mode M3A, the sampling period T can be set to be shorter than in the second signal processing mode M2. Hereinafter, the processing time that is necessary to output the data DAx2, DAy2, DAz2 to the host device 5 after acquiring the data DAx, DAy, DAz is referred to as Tm3 (<Tm2). The time taken for signal processing is substantially the same in the angular velocity mode M3ω and in the acceleration mode M3A. Therefore, in this embodiment, the same processing time Tm3 is employed. However, this is not limiting. The processing time may differ between these modes.

The first signal processing mode M1, the second signal processing mode M2, and the third signal processing mode M3 have been described above. The mode selection circuit 45 switches the processing mode according to the signal processing requested by the host device 5, for example.

The signal processing circuit 4 performs signal processing in the first signal processing mode M1 when the data Dωx3, Dωy3, Dωz3, DAx3, DAy3, DAz3 are requested by the host device 5. A sampling period T1 in this case can be suitably set, using the processing time Tm1 as the lower limit value. The sampling period T1 may be preferably set to be equal to the processing time Tm1. Thus, the sampling period T can be made as short as possible and the quantization error can be reduced. Therefore, balance can be taken between the quantization error and the limitation to the signal processing while the content of signal processing is prioritized. For example, the data Dωx3, Dωy3, Dωz3, DAx3, DAy3, DAz3 are a "first data set" in the claims.

The signal processing circuit 4 performs signal processing in the second signal processing mode M2 when the data Dωx2, Dωy2, Dωz2, DAx2, DAy2, DAz2 are requested by the host device 5. A sampling period T2 in this case can be suitably set, using the processing time Tm2 as the lower limit value and the processing time Tm1 as the upper limit value. The sampling period T2 may be preferably set to be equal to the processing time Tm2. Thus, the sampling period T can be made as short as possible and the quantization error can be reduced. Therefore, balance can be taken between the quantization error and the limitation to the signal processing while the content of signal processing is prioritized. For example, the data Dωx2, Dωy2, Dωz2, DAx2, DAy2, DAz2 are a "second data set" in the claims. The sampling period T2 in the second signal processing mode M2 is shorter than the sampling period T1 in the first signal processing mode M1.

The signal processing circuit 4 performs signal processing in the angular velocity mode M3ω of the third signal processing mode M3 when the data Dωx2, Dωy2, Dωz2 are requested by the host device 5. A sampling period T3ω in this case can be suitably set, using the processing time Tm3 as the lower limit value and the processing time Tm2 as the upper limit value. The sampling period T3ω may be preferably set to be equal to the processing time Tm3. Thus, the sampling period T can be made as short as possible and the quantization error can be reduced. Therefore, balance can be taken between the quantization error and the limitation to the signal processing while the content of signal processing is prioritized. The sampling period T3ω in the angular velocity mode M3ω of the third signal processing mode M3 is shorter than the sampling period T1 in the first signal processing mode M1 and the sampling period T2 in the second signal processing mode M2. For example, the data Dωx2, Dωy2, Dωz2 may be referred to as a "third data set".

The signal processing circuit 4 performs signal processing in the acceleration mode M3A of the third signal processing mode M3 when the data DAx2, DAy2, DAz2 are requested by the host device 5. A sampling period T3A in this case can be suitably set, using the processing time Tm3 as the lower limit value. The sampling period T3A may be preferably set to be equal to the processing time Tm3. Thus, the sampling period T can be made as short as possible and the quantization error can be reduced. Therefore, balance can be taken between the quantization error and the limitation to the signal processing while the content of signal processing is prioritized. The sampling period T3A in the acceleration mode M3A of the third signal processing mode M3 is shorter than the sampling period T1 in the first signal processing mode M1 and the sampling period T2 in the second signal processing mode M2. For example, the data DAx2, DAy2, DAz2 may be referred to as a "fourth data set".

Such a configuration enables output of requested data to the host device 5 in a shorter sampling period T. Therefore, balance can be taken between the quantization error and the limitation to the signal processing while the content of signal processing is prioritized.

The case where the signal processing mode is switched according to the signal processing requested by the host device 5 has been described above. Other than this method, the signal processing circuit 4 may switch the signal processing mode according to the sampling period T requested by the host device 5.

The signal processing circuit 4 performs signal processing in the first signal processing mode M1 when the sampling period T requested by the host device 5 is equal to or longer than the processing time Tm1. Thus, all the signal processing that can be performed by the signal processing circuit 4 is performed and more accurate data can be outputted to the host device 5. Therefore, balance can be taken between the quantization error and the limitation to the signal processing while the sampling period T is prioritized.

The signal processing circuit 4 performs signal processing in the second signal processing mode M2 when the sampling period T requested by the host device 5 is equal to or longer than the processing time Tm2 and shorter than the processing time Tm1. Thus, as much processing as possible can be performed within the requested sampling period T and data with as high accuracy as possible can be outputted to the host device 5. Therefore, balance can be taken between the quantization error and the limitation to the signal processing while the sampling period T is prioritized.

The signal processing circuit 4 performs signal processing in the third signal processing mode M3 when the sampling period T requested by the host device 5 is equal to or longer than the processing time Tm3 and shorter than the processing time Tm2. Thus, as much processing as possible can be performed within the requested sampling period T and data with as high accuracy as possible can be outputted to the host device 5. Therefore, balance can be taken between the quantization error and the limitation to the signal processing while the sampling period T is prioritized. Whether to select the angular velocity mode M3ω or the acceleration mode M3A can be suitably decided. Also, for example, alternately switching between the angular velocity mode M3ω and the acceleration mode M3A enables the data Dωx, Dωy, Dωz about angular velocity and the data DAx, DAy, DAz about acceleration to be alternately outputted to the host device 5. Therefore, the host device 5 can acquire the data about all the six axes.

Such a configuration enables the execution of as much processing as possible within the requested sampling period T and the output of data with as high accuracy as possible to the host device 5. Therefore, balance can be taken between the quantization error and the limitation to the signal processing while the sampling period T is prioritized.

The measurement system 10 has been described above. The sensor module 1 included in such a measurement system 10 has the 3-axis angular velocity sensor device 2 and the 3-axis acceleration sensor device 3, which are inertial sensors, and the signal processing circuit 4, which is a processing circuit processing the data Dωx, Dωy, Dωz, DAx, DAy, DAz, which are output signals from the 3-axis angular velocity sensor device 2 and the 3-axis acceleration sensor device 3, as described above. The signal processing circuit 4 varies the processing of the data Dωx, Dωy, Dωz, DAx, DAy, DAz according to the sampling period T for acquiring the data Dωx, Dωy, Dωz, DAx, DAy, DAz. Such a configuration enables the execution of as much signal processing as possible within the requested sampling period T. Therefore, balance can be taken between the quantization error and the limitation to the signal processing while the sampling period T is prioritized.

As described above, the signal processing circuit 4 makes the number of processing steps for the data Dωx, Dωy, Dωz, DAx, DAy, DAz smaller as the sampling period T becomes shorter. That is, the signal processing circuit 4 performs signal processing in the first signal processing mode M1 when the sampling period T is equal to or longer than the processing time Tm1, and performs signal processing in the second signal processing mode M2 having fewer processing steps than the first signal processing mode M1, when the sampling period T is equal to or longer than the processing time Tm2 and shorter than the processing time Tm1. Thus, the time taken for signal processing can more easily fall within the requested sampling period T and balance can be taken between the quantization error and the limitation to the signal processing.

As described above, the signal processing circuit 4 has the first signal processing unit 41, the second signal processing unit 42, and the third signal processing unit 43 as a plurality of signal processing units performing different types of processing on the data Dωx, Dωy, Dωz, DAx, DAy, DAz, and processes the data Dωx, Dωy, Dωz, DAx, DAy, DAz by more signal processing units as the sampling period T becomes longer. That is, the signal processing circuit 4 performs signal processing by the first signal processing unit 41, the second signal processing unit 42, and the third signal processing unit 43 when the sampling period T is equal to or longer than the processing time Tm1, and performs signal processing by the first signal processing unit 41 and the second signal processing unit 42 when the sampling period T is equal to or longer than the processing time Tm2 and shorter than the processing time Tm1. Thus, the time taken for signal processing can more easily fall within the requested sampling period T and balance can be taken between the quantization error and the limitation to the signal processing.

As described above, the sensor module 1 has the 3-axis angular velocity sensor device 2 and the 3-axis acceleration sensor device 3 as a plurality of inertial sensors, and the signal processing circuit 4 processes output signals from more inertial sensors as the sampling period T becomes longer. That is, the signal processing circuit 4 performs signal processing on output signals from both the 3-axis angular velocity sensor device 2 and the 3-axis acceleration sensor device 3 when the sampling period T is equal to or longer than the processing time Tm2, and performs signal processing only on an output signal from one of the 3-axis angular velocity sensor device 2 and the 3-axis acceleration sensor device 3 when the sampling period T is shorter than the processing time Tm2. Thus, the time taken for signal processing can more easily fall within the requested sampling period T and balance can be taken between the quantization error and the limitation to the signal processing.

As described above, the sensor module 1 has the 3-axis angular velocity sensor device 2 and the 3-axis acceleration sensor device 3, which are inertial sensors, and the signal processing circuit 4, which is a processing circuit processing the data Dωx, Dωy, Dωz, DAx, DAy, DAz, which are output signals from the 3-axis angular velocity sensor device 2 and the 3-axis acceleration sensor device 3. The signal processing circuit 4 changes the sampling period T for acquiring the data Dωx, Dωy, Dωz, DAx, DAy, DAz according to the content of processing of the data Dωx, Dωy, Dωz, DAx, DAy, DAz. Such a configuration enables the output of requested data in a shorter sampling period T. Therefore, balance can be taken between the quantization error and the limitation to the signal processing while the content of signal processing is prioritized.

As described above, the signal processing circuit 4 makes the sampling period T shorter as the number of processing steps for the data Dωx, Dωy, Dωz, DAx, DAy, DAz becomes smaller. That is, the sampling period T in the second signal processing mode M2, where signal processing is performed by the first signal processing unit 41 and the second signal processing unit 42, is made shorter than the sampling period T in the first signal processing mode M1, where signal processing is performed by the first signal processing unit 41, the second signal processing unit 42, and the third signal processing unit 43. Thus, balance can be taken more effectively between the quantization error and the limitation to the signal processing.

As described above, the signal processing circuit 4 has the first signal processing unit 41, the second signal processing unit 42, and the third signal processing unit 43 as a plurality of signal processing units performing different types of processing on the data Dωx, Dωy, Dωz, DAx, DAy, DAz, and makes the sampling period T longer as the number of signal processing units processing the data Dωx, Dωy, Dωz, DAx, DAy, DAz becomes greater. That is, the sampling period T in the second signal processing mode M2, where signal processing is performed by the first signal processing unit 41 and the second signal processing unit 42, is made shorter than the sampling period T in the first signal processing mode M1, where signal processing is performed by the first signal processing unit 41, the second signal processing unit 42, and the third signal processing unit 43. Thus, balance can be taken more effectively between the quantization error and the limitation to the signal processing.

As described above, the 3-axis angular velocity sensor device 2 and the 3-axis acceleration sensor device 3 as a plurality of inertial sensors are provided, and the signal processing circuit 4 makes the sampling period T longer as the number of inertial sensors processing an output signal becomes greater. That is, the sampling period T in the first and second signal processing modes M1, M2, where signal processing is performed on output signals from both the 3-axis angular velocity sensor device 2 and the 3-axis acceleration sensor device 3, is made longer than the sampling period T in the third signal processing mode M3, where signal processing is performed only on an output signal from one of the 3-axis angular velocity sensor device 2 and the 3-axis acceleration sensor device 3. Thus, balance can be taken between the quantization error and the limitation to the signal processing.

As described above, the sensor module 1 has the 3-axis angular velocity sensor device 2 and the 3-axis acceleration sensor device 3, which are inertial sensors, and the signal processing circuit 4, which is a processing circuit processing the data Dωx, Dωy, Dωz, DAx, DAy, DAz, which are output signals from the 3-axis angular velocity sensor device 2 and the 3-axis acceleration sensor device 3. The signal processing circuit 4 sets the content of processing to be performed on the data Dωx, Dωy, Dωz, DAx, DAy, DAz from the 3-axis angular velocity sensor device 2 and the 3-axis acceleration sensor device 3 and the sampling period T for acquiring the data Dωx, Dωy, Dωz, DAx, DAy, DAz from the 3-axis angular velocity sensor device 2 and the 3-axis acceleration sensor device 3, according to data requested by the host device 5. Thus, the sampling period T can be made as short as possible and the quantization error can be reduced. Therefore, balance can be taken between the quantization error and the limitation to the signal processing while the content of signal processing is prioritized.

As described above, a first mode where the sampling period T is set to be a first period when the data requested by the host device 5 is a first data set, and a second mode where the sampling period T is set to be a second period that is shorter than the first period when the data requested by the host device 5 is a second data set that is different from the first data set, are provided. The signal processing circuit 4 executes the switching between a plurality of modes including the first mode and the second mode. In this embodiment, one of the first signal processing mode M1, the second signal processing mode M2, and the third signal processing mode M3 is the first mode and any of the other two is the second mode. Such a configuration enables the output of requested data to the host device 5 in a shorter sampling period T. Therefore, balance can be taken between the quantization error and the limitation to the signal processing while the content of signal processing is prioritized.

As described above, the measurement system 10 has the sensor module 1 and the host device 5 electrically coupled to the sensor module 1. Thus, the measurement system 10 can achieve the effects of the sensor module 1.

Second Embodiment

Figure 7:
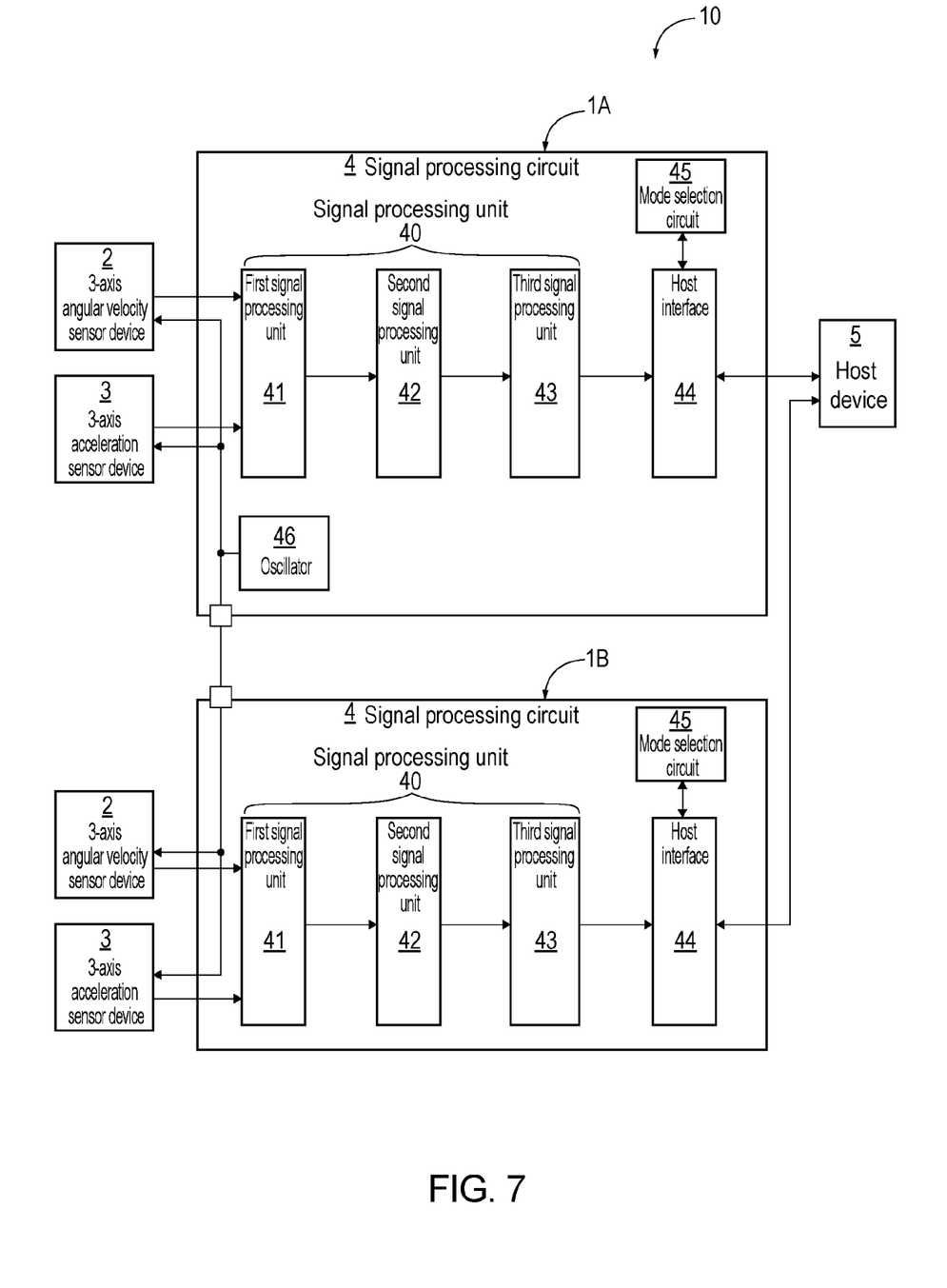
FIG. 7 is a block diagram showing an overall configuration of a measurement system according to a second embodiment.
Figure 8:
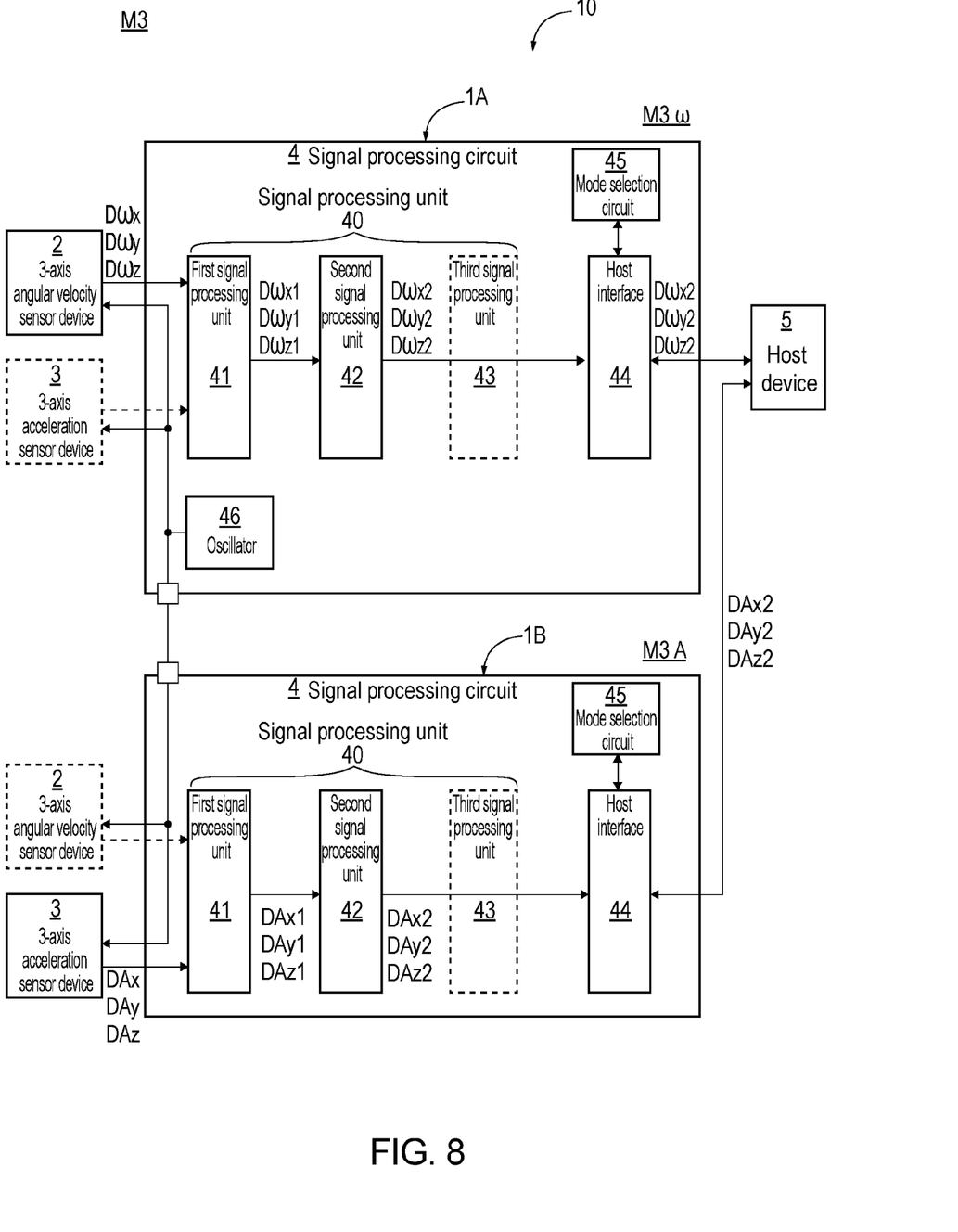
FIG. 8 is a block diagram showing signal processing in a third signal processing mode.

FIG. 7 is a block diagram showing an overall configuration of a measurement system according to a second embodiment. FIG. 8 is a block diagram showing signal processing in a third signal processing mode.

The measurement system 10 according to this embodiment is similar to the measurement system 10 according to the first embodiment, except for having two sensor modules 1. In the description below, this embodiment is described mainly in terms of the difference from the foregoing embodiment and the description of similar matters is omitted. In FIGS. 7 and 8, components similar to those in the foregoing embodiment are denoted by the same reference signs.

As shown in FIG. 7, in this embodiment, two sensor modules LA, 1B are coupled together in a synchronized state. In the illustrated configuration, the sensor modules 1A, 1B are synchronized with each other, based on an oscillation signal outputted from an oscillator 46 installed in the signal processing circuit 4 of the sensor module LA. The sensor modules 1A, 1B and the host device 5 are coupled together via an SPI (serial peripheral interface), for example. However, the method for coupling these components is not particularly limited.

In the first signal processing mode M1 and the second signal processing mode M2, signal processing is performed using one or both of the sensor modules 1A, 1B. The processing method is similar to the processing method in the first embodiment and therefore the description thereof is omitted. Meanwhile, in the third signal processing mode M3, signal processing is performed using one of the sensor modules 1A, 1B. The third signal processing mode M3 will now be described in detail.

In the first embodiment, only one sensor module 1 is used. Therefore, in the third signal processing mode M3, data about all the six axes cannot be outputted to the host device 5 unless the angular velocity mode M3ω and the acceleration mode M3A are switched alternately.

Meanwhile, in this embodiment, two sensor modules 1A, 1B are used. Therefore, the sensor module 1A is set in the angular velocity mode M3ω and the sensor module 1B is set in the acceleration mode M3A, as shown in FIG. 8. Thus, data about all the six axes can be simultaneously outputted to the host device 5. Therefore, the output rate can be increased to twice the output rate in the first embodiment.

Such a second embodiment can achieve effects similar to those of the first embodiment described above.

The sensor module and the measurement system according to the present disclosure have been described above, based on the illustrated embodiments. However, the present disclosure is not limited to these embodiments. The configuration of each part can be replaced with any configuration having a similar function. Also, any other component may be added to the present disclosure. The embodiments described above may be combined together according to need.

For example, while the signal processing unit 40 in the embodiments described above has the first signal processing unit 41, the second signal processing unit 42, and the third signal processing unit 43, this is not limiting. One of these units may be omitted. Also, the signal processing unit 40 may have at least one other signal processing unit. The content of signal processing in each signal processing mode is not particularly limited. While the first signal processing mode M1, the second signal processing mode M2, and the third signal processing mode M3 are provided in the embodiments described above, this is not limiting. One of these modes may be omitted. Also, further at least one other signal processing mode may be provided.

What is claimed is:

1. A sensor module comprising:
a plurality of inertial sensors; and
a processing circuit selecting one of a plurality of signal processing modes as a selected signal processing mode, and processing output signals from the plurality of inertial sensors according to the selected signal processing mode,
the processing circuit selecting the one of the plurality of signal processing modes as the selected signal processing mode based on a length of a sampling period for acquiring the output signals, wherein
the plurality of signal processing modes includes a signal processing mode having an angular velocity mode in which data from an angular velocity sensor device, as an inertial sensor of the plurality of inertial sensors, is processed, and an acceleration mode in which data from an acceleration sensor device, as an inertial sensor of the plurality of inertial sensors, is processed, and, in said signal processing mode, the processing circuit selects either of the angular velocity mode or the acceleration mode such that one of the data associated with the angular velocity mode and the acceleration mode is omitted from processing.

2. The sensor module according to claim 1, wherein
the processing circuit selects the one of the plurality of signal processing modes as the selected signal processing mode so that a number of processing steps for the output signals becomes smaller as the length of the sampling period becomes shorter.

3. The sensor module according to claim 1, wherein
the processing circuit has a plurality of signal processing units performing different types of processing from each other on the output signals, and selects the one of the plurality of signal processing modes as the selected signal processing mode so that the output signals are processed by more of the signal processing units as the length of the sampling period becomes longer.

4. The sensor module according to claim 1, wherein
the processing circuit selects the one of the plurality of
   signal processing modes as the selected signal processing mode so that the output signals are processed from
   more of the plurality of inertial sensors as the length of
   the sampling period becomes longer.

5. A measurement system comprising:
the sensor module according to claim 1; and
a host device electrically coupled to the sensor module.

* * * * *